US012766811B2

(12) United States Patent
Thomas et al.

(10) Patent No.: US 12,766,811 B2
(45) Date of Patent: Oct. 20, 2026

(54) SOUND CONTROL FABRICS, MATS, SYSTEMS, AND METHODS

(71) Applicant: GP Industrial Plasters LLC, Atlanta, GA (US)

(72) Inventors: Vincent B. Thomas, Bogart, GA (US); William Howard, Fort Mill, SC (US); Matthew Schroder, Savannah, GA (US)

(73) Assignee: GP Industrial Plasters LLC, Atlanta, GA (US)

( * ) Notice: Subject to any disclaimer, the term of this patent is extended or adjusted under 35 U.S.C. 154(b) by 490 days.

(21) Appl. No.: 17/737,299

(22) Filed: May 5, 2022

(65) Prior Publication Data

US 2022/0363032 A1 Nov. 17, 2022

Related U.S. Application Data

(60) Provisional application No. 63/188,599, filed on May 14, 2021.

(51) Int. Cl.
*B32B 5/26* (2006.01)
*B32B 5/02* (2006.01)
(Continued)

(52) U.S. Cl.
CPC .............. *B32B 5/267* (2021.05); *B32B 5/022* (2013.01); *B32B 37/1284* (2013.01); *C09J 5/06* (2013.01); *C09J 123/06* (2013.01); *C09J 123/0853* (2013.01); *C09J 123/12* (2013.01); *C09J 175/04* (2013.01); *E04F 15/20* (2013.01);
(Continued)

(58) Field of Classification Search
CPC ....... E04F 15/20; E04F 15/206; E04F 15/203; B32B 5/267; B32B 5/022; B32B 37/1284; B32B 2307/102; B32B 2323/043; B32B 2323/046; B32B 2323/10; C09J 123/06;
(Continued)

(56) References Cited

U.S. PATENT DOCUMENTS 7,096,630 B1 8/2006 Keene et al.
7,618,907 B2 11/2009 Tilton
(Continued)

FOREIGN PATENT DOCUMENTS

EP 2479331 B1 12/2014
EP 2599908 B1 3/2015
(Continued)

OTHER PUBLICATIONS

Wikipedia article, Hydroentanglement, spunlace (Year: 2021).*
(Continued)

*Primary Examiner* — Jeremy A Luks

(57) ABSTRACT

A fabric composite for a gypsum underlayment sound control mat includes a first layer including a spunbond polyolefin layer, a second layer including a nonwoven polyolefin layer, and a hot-melt adhesive layer between and bonding the first layer and the second layer. A gypsum underlayment sound control mat may include the fabric composite bonded to an entangled mesh layer. A flooring system may include a gypsum or gypsum-concrete underlayment over the fabric composite or the mat. The fabric composite may be free of halogenated agents.

18 Claims, 13 Drawing Sheets

(51) Int. Cl.

| | |
|---|---|
| ***B32B 37/12*** | (2006.01) |
| ***C09J 5/06*** | (2006.01) |
| ***C09J 123/06*** | (2006.01) |
| ***C09J 123/08*** | (2006.01) |
| ***C09J 123/12*** | (2006.01) |
| ***C09J 175/04*** | (2006.01) |
| ***E04F 15/20*** | (2006.01) |

(52) U.S. Cl.
CPC ... *B32B 2307/102* (2013.01); *B32B 2323/043* (2013.01); *B32B 2323/046* (2013.01); *B32B 2323/10* (2013.01)

(58) Field of Classification Search
CPC ... C09J 123/0853; C09J 123/12; C09J 175/04
See application file for complete search history.

(56) References Cited

U.S. PATENT DOCUMENTS

| | | | | |
|---|---|---|---|---|
| 7,776,251 | B2 | 8/2010 | Griffin et al. | |
| 7,786,028 | B2 | 8/2010 | Souther et al. | |
| 7,886,488 | B2 | 2/2011 | Payne, Jr. et al. | |
| 7,919,420 | B2 | 4/2011 | Bornemann et al. | |
| 8,007,886 | B2 | 8/2011 | Tierney et al. | |
| 8,171,687 | B2 | 5/2012 | Dellinger et al. | |
| 8,341,910 | B2 * | 1/2013 | Collison | E04F 15/186 52/403.1 |
| 8,544,218 | B2 | 10/2013 | Dellinger et al. | |
| 9,157,231 | B2 * | 10/2015 | Wingfield | E04B 1/84 |
| 9,499,975 | B2 | 11/2016 | Thomas et al. | |
| 9,587,334 | B2 | 3/2017 | Takebe et al. | |
| 9,805,708 | B2 | 10/2017 | Kim | |
| 9,922,634 | B2 | 3/2018 | Thompson, Jr. et al. | |
| 10,316,527 | B2 | 6/2019 | Keene | |
| 10,370,860 | B2 * | 8/2019 | Socha | E04F 15/203 |
| 10,538,912 | B2 | 1/2020 | Roy | |
| 10,655,255 | B2 | 5/2020 | Inokuma et al. | |
| 10,655,341 | B2 * | 5/2020 | Hascher | E04F 15/18 |
| 10,767,296 | B2 | 9/2020 | Ramaratnam et al. | |
| 2003/0203152 | A1 * | 10/2003 | Higgins | D06N 7/0086 428/95 |
| 2006/0185134 | A1 | 8/2006 | Carter et al. | |
| 2007/0039268 | A1 | 2/2007 | Ambrose, Jr. et al. | |
| 2017/0196414 | A1 | 7/2017 | Erlandsson et al. | |
| 2020/0094532 | A1 | 3/2020 | Kinlaw et al. | |
| 2020/0095713 | A1 | 3/2020 | Kreuzer et al. | |
| 2020/0166011 | A1 | 5/2020 | Choi et al. | |
| 2020/0181819 | A1 | 6/2020 | Pots et al. | |
| 2020/0254719 | A1 | 8/2020 | Hattori et al. | |
| 2020/0270787 | A1 | 8/2020 | Pourdeyhimi | |
| 2020/0308743 | A1 | 10/2020 | Polosa | |
| 2020/0391478 | A1 | 12/2020 | Hattori et al. | |
| 2021/0086117 | A1 | 3/2021 | Avril et al. | |
| 2021/0146652 | A1 | 5/2021 | Wang et al. | |
| 2021/0162702 | A1 | 6/2021 | Chaut et al. | |
| 2022/0356617 | A1 | 11/2022 | Ramaratnam et al. | |
| 2022/0364281 | A1 | 11/2022 | Ramaratnam et al. | |

FOREIGN PATENT DOCUMENTS

| | | | | |
|---|---|---|---|---|
| EP | 1980390 | B2 | 12/2016 | |
| EP | 2896731 | B1 | 3/2018 | |
| EP | 3023526 | B1 | 9/2018 | |
| EP | 2889407 | B1 | 11/2018 | |
| EP | 2918718 | B1 | 11/2018 | |
| EP | 3413302 | A1 | 12/2018 | |
| EP | 3693500 | A1 | 8/2020 | |
| EP | 3551794 | B1 | 2/2021 | |
| EP | 3763521 | B1 | 7/2022 | |
| GB | 2494544 | B | 8/2013 | |
| GB | 2494543 | B | 9/2013 | |
| GB | 2496244 | B | 11/2013 | |
| GB | 2525103 | B | 6/2016 | |
| KR | 101515148 | B1 | 4/2015 | |
| WO | 2005080461 | A1 | 9/2005 | |
| WO | WO-2021154768 | A1 * | 8/2021 | B32B 21/10 |
| WO | 2022238824 | A1 | 11/2022 | |
| WO | 2023012159 | A1 | 2/2023 | |

OTHER PUBLICATIONS

Wikipedia article, Nonwoven fabric, spunlace (Year: 2021).*
International Search Report and Written Opinion received for PCT Application No. PCT/IB2022/054168 , mailed on Jul. 18, 2022, 10 Pages.

* cited by examiner

SOUND CONTROL FABRICS, MATS, SYSTEMS, AND METHODS

CROSS-REFERENCE TO RELATED APPLICATIONS

The present application claims priority to and the benefit of U.S. Provisional Patent Application Ser. No. 63/188,599, filed May 14, 2021; the entire contents of which as are hereby incorporated herein by reference.

BACKGROUND

Related Field

The present invention relates generally to the field of sound control fabrics and mats, and more particularly to sound control fabrics and mats for use in building construction.

Related Art

Plaster-based materials are used in a variety of building and construction applications where sound dampening properties are desirable. For example, gypsum panels are used in wall, door, floor, ceiling, roof, and other building applications. In multi-family and commercial buildings, floor/ceiling assemblies commonly include plaster-based materials as part of the subfloor structure. For example, gypsum underlayments are typically applied over wood frame and concrete construction in floor/ceiling assemblies to create a smooth, monolithic floor surface that delivers light weight, high compressive strength, sound control, and fire resistance as compared to Portland cement and other products.

To mitigate impact or airborne related noise from transferring through such structures, sound control mats may be laid over wood or concrete subfloors. The mats are a fabric material which creates an air space between the subfloor and gypsum underlayment. The air space serves to mechanically isolate and decouple impact related vibrations. The mat is typically topped with a pumpable, sanded gypsum underlayment ¾ to 1½ inch thick and screeded to maintain a uniform depth and finish.

Halogenated agents, for example, such as per- and polyfluoroalkyl substances (PFAS), perfluorooctanoic Acid (PFOA), perfluorooctanesulfonic acid (PFOS), or fluoropolymers, may be used to promote water resistance of the fabrics and to maintain dryness of mats during the manufacturing process (i.e. during manufacturing the 3D polymer extrusion process uses a water quenching bath to cool the polymer entangled mesh) and prevent the risk of polymer cracking and distortion. The water quench also wets the fabric, so if the water absorption properties of the fabric is too high this affects the ability to produce a dry finished product. However, the use of halogenated agents is being increasingly discouraged by regulatory agencies and consumers.

A need remains for sound control mats, and for fabrics for sound control mats, that exhibit improvements in water resistance, but without using halogenated agents.

BRIEF SUMMARY

The present disclosure describes sound control fabric composites, mats, systems, and methods.

In embodiments, a fabric composite for a gypsum underlayment sound control mat includes a first layer including a spunbond polyolefin layer, a second layer including a nonwoven polyolefin layer, and a hot-melt adhesive layer between and bonding the first layer and the second layer. In certain aspects, the fabric composite is free of halogenated agents.

In embodiments, a gypsum underlayment sound control mat may include the fabric composite bonded to an entangled mesh layer.

In embodiments, a flooring system may include a gypsum or gypsum-concrete underlayment over the fabric composite or the mat.

In embodiments, a method for dampening sound transmission across a subfloor includes laying the mat over the subfloor and pouring a gypsum underlayment over the mat.

BRIEF DESCRIPTION OF THE DRAWINGS

Referring now to the drawings, which are meant to be exemplary and not limiting, and wherein like elements are numbered alike. The detailed description is set forth with reference to the accompanying drawings illustrating examples of the present disclosure, in which use of the same reference numerals indicates similar or identical items. Certain embodiments of the present disclosure may include elements, components, and/or configurations other than those illustrated in the drawings, and some of the elements, components, and/or configurations illustrated in the drawings may not be present in certain embodiments.

Figure 1:
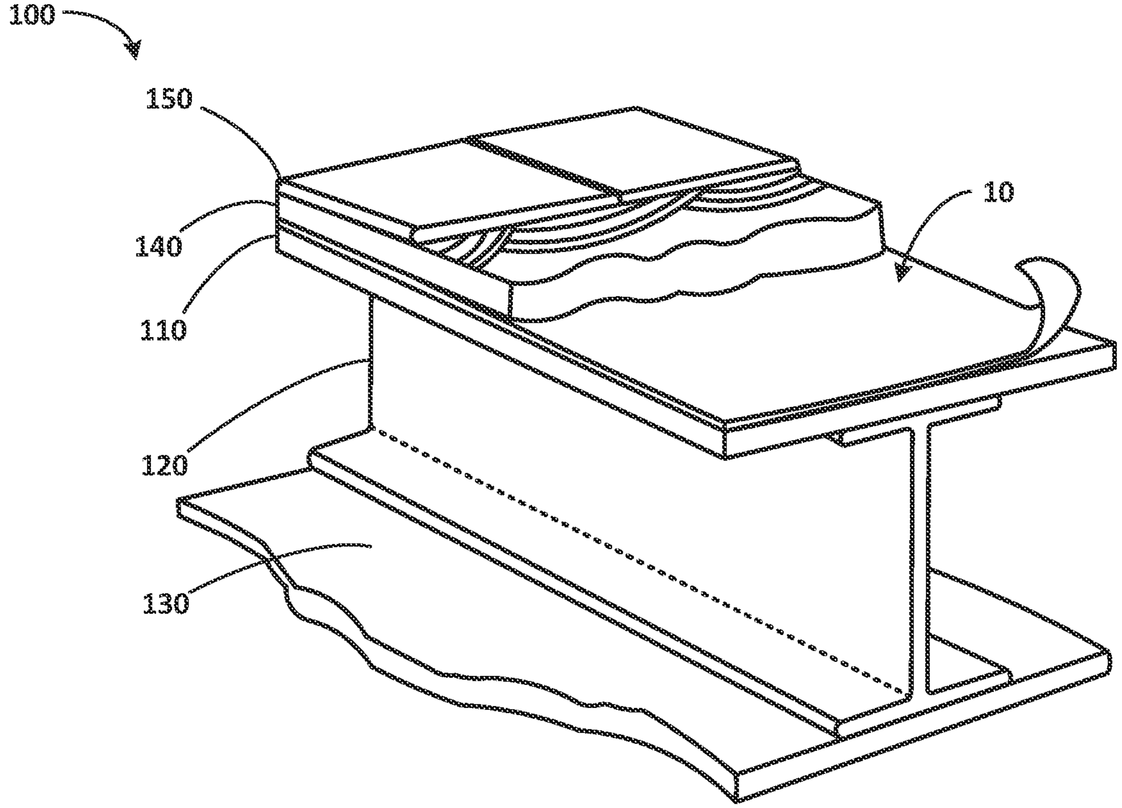
FIG. 1 is a conceptual partial perspective view of a flooring system including a sound control mat.

Various embodiments of this disclosure are for purposes of illustration only. Parameters of different steps, components, and features of the embodiments are described separately, but may be combined consistently with this description of claims, to enable other embodiments as well to be understood by those skilled in the art. Various terms used herein are likewise defined in the description, which follows.

DETAILED DESCRIPTION OF VARIOUS EMBODIMENTS

The present disclosure describes sound control fabric composites, mats, systems, and methods. In embodiments, a sound control mat according to the present disclosure include a fabric composite bonded to an open entangled mesh layer (three-dimensional polymer filament). The mat creates an airspace between flooring components for sound control. For example, in certain building constructions, sound control mats are installed between a subfloor and a pumpable gypsum underlayment, to reduce impact and airborne noise transmission between adjacent rooms or units. Sound control mats used in this manner can be effective at dampening or isolating noise and exponentially improving the architectural noise ratings such as Impact Isolation Class (IIC) per ASTM E492/E989 and Sound Transmission Class (STC) per ASTM E336/E413.

Fabrics used in sound control mats may include either single layer or multilayer composites depending on the attributes required in the final product. One of the roles of the fabric is to provide a backer for the entangled mesh layer as it is manufactured, to be easily wound into rolls for shipping, and unwound when installed at the construction job site. If that is the only property considered, then single layer fabrics may be suitable. However, fabrics having additional attributes, such as being able to bond with the gypsum underlayment, water barrier properties, tape adhesion, and dryness at time of manufacturing, result in improved sound control mats. Fabric composites according to the present disclosure may provide one or more such advantages, and without the presence of halogenated agents.

For example, a gypsum slurry underlayment (such as Gyperete 2000 made by Georgia-Pacific Industrial Plasters LLC for Maxxon® Corporation) is poured over a sound control mat on a subfloor and screeded to a uniform thickness. Providing a strong bond between the gypsum underlayment and the fabric composite of the sound control mat may prevent excessive movement in the finished floor, and mitigate cracking issues associated with certain types of hard surface flooring, such as tile, provided over the underlayment. Water barrier properties prevent the liquid gypsum slurry from flowing into the airgap created by the entangled mesh layer and compromising noise isolation properties. Tape adhesion facilitates joining adjacent rolls of sound control mats together on the floor to prevent unintended gaps between mats that could compromise sound properties. Dryness of manufacture mat rolls promote comfort and safety as applicators install on the floor while kneeling, and wet mats may be uncomfortable. During manufacturing, 3D polymer extrusion process for forming the entangled mesh layer uses a water quenching bath to cool the mesh and prevent the risk of polymer cracking and distortion. However, if the water absorption properties of the fabrics are too high this affects the ability to produce a dry product.

Certain tri-laminate composite fabrics are known, in which the layers consist of a bottom layer of 20 grams per square meter (gsm) polypropylene spunbond, a middle layer of 30 gsm polyethylene film, and a top layer of 55 gsm polyester needlepunch (polyethylene terephthalate). In this fabric composite, the function of the polypropylene spunbond bottom layer is to make a strong bond with the 3D entangled polymer mesh, which is also polypropylene. The bottom layer also creates a barrier which prevents liquid gypsum slurry from penetrating into the airspace created. The middle PET film layer bonds the bottom layer and top layers together. The top needlepunch PET layer creates a strong mechanical bond with the gypsum slurry and bonds with tape adhesives.

However, the top layer of PET needlepunch fibers besides bonding with gypsum also have high surface area and an affinity for water uptake during the quenching portion of the manufacturing process, therefore, this layer is treated with a halogenated agent to reduce water absorption. It may be desirable to avoid using halogenated agents for various reasons, for example, in view of regulations on such agents, or in view of consumer preference to avoid using such agents. Use of halogenated agents, for example, halogenated compounds or polymers in the top layer may also create product performance issues, such as tape adhesive bonding issues with the finished sound mat product since fluoropolymers can be difficult to bond to. Therefore, a need remains for improved fabric composites for sound control mats, for example, having low water absorption but without the use of halogenated agents, allowing for a dry manufactured product while maintaining sufficiently strong gypsum bond and tape adhesive bond properties.

In embodiments, a fabric composite for a gypsum underlayment sound control mat includes a first layer including a spunbond polyolefin layer, a second layer including a nonwoven polyolefin layer, and a hot-melt adhesive layer between and bonding the first layer and the second layer. In certain aspects, the fabric composite is free of halogenated agents. For example, no halogenated agents may be present in the fabric composite, or in a sound control mat including the fabric composite.

Sound control mats described herein may be easily applied in a flooring system during construction or repair, and liquid underlayment may be conveniently pumped or poured over sound control mats to ultimately form a sound dampening flooring.

Exemplary Structure and Composition

For example, FIG. 1 is a conceptual partial perspective view of a flooring system 100 including a sound control mat 10. Sound control mat 10 is adjacent a subfloor 110 that is supported by a floor joist 120. In embodiments, subfloor 110 includes wood or concrete. The wood may include oriented strand board (OSB) or plywood. Floor joist 120 may be adjacent a ceiling panel 130. In embodiments, panel 130 includes gypsum board.

An underlayment layer 140 may be applied on the joist 120 over sound control mat 10 and screeded to achieve a uniform thickness and finish. For example, the underlayment layer 140 may be pumped or poured onto the sound control mat 10 and allowed to set. In certain embodiments, underlayment layer 140 may have a thickness of about 0.25 inch to about 1½ inches. Flooring 150 may be applied to the set surface of the underlayment layer 140. For example, flooring 150 may include ceramic tile, vinyl, wood, composite, or any other suitable flooring material. In addition to sound control mat 10, flooring system 100 may include other layers, such as woven, non-woven, felt, rubber, cork, polymeric, or other layers, for example, between underlayment layer 140 and subfloor 110, or between flooring 150 and underlayment 140

Sound control mat 10 may increase the sound dampening attributes of flooring assembly 100. Sound control mat 10 includes a fabric composite 12, which may promote one or more attributes such as sound dampening, gypsum bonding, tape adhesion, or water resistance.

Figure 2:
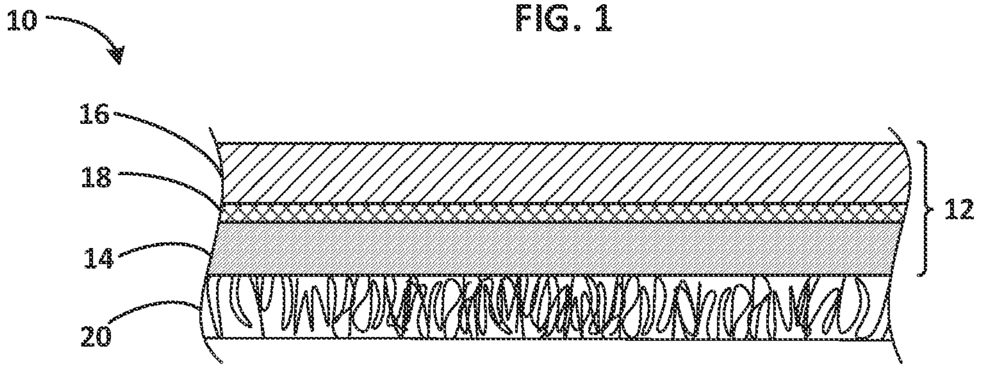
FIG. 2 is a partial cross-section view of a sound control mat including a fabric composite and an entangled mesh layer.

FIG. 2 is a partial cross-section view of sound control mat 10 including fabric composite 12 and an entangled mesh layer 20.

Fabric composite 12 includes a first layer 14 including a spunbond polyolefin layer, a second layer 16 including a nonwoven polyolefin layer, and a hot-melt adhesive layer 18 between and bonding first layer 14 and second layer 16.

The term "polyolefin" refers to polymers formed by polymerizing olefin monomer units. Polymers may be formed into filaments and/or fabrics using any suitable techniques. The technique used to form polymer filaments may influence the properties of a layer including such filaments. For example, the same polyolefin may be formed into filaments, nonwoven fabrics, or mats having different properties using different processes, and layers formed using such techniques may be referenced by the fabrication technique. While certain examples of processes used to form polymeric layers are described herein, any appropriate known variations of such techniques may be employed.

For example, a spunbond polyolefin layer may be formed by spinning a melted polyolefin matrix extruded through spinnerets, followed by bonding of the filaments and winding. The bonding may be thermal, mechanical, or chemical, or any other suitable bonding.

A meltblown polyolefin layer may be formed by blowing high-velocity air or gas across a melted polyolefin stream, film, or layer, directly forming filaments that are collected as a web.

A spunlace polyolefin layer may be formed by hydroentanglement, in which filaments are consolidated by exposure to high velocity water jets.

A needlepunched polyolefin layer may be formed by mechanically needling filaments or webs with needles to promote intermeshing of filaments.

A spun-melt-spun layer may include sublayers, for example, spunbond-meltblown-spunbond layers. A spun-melt-melt-spun layer may include sublayers, for example, spunbond-meltblown-meltblown-spunbond layers.

Different layers may be formed of the same polymer or of different polymers. The same polymer in different layers may have substantially the same polymer weight range or may differ in polymer weight or other aspects such as chain length, branching, and the like. The same polymer in different layers may also differ in polymer grade, for example, polyethylene may be high-density, medium-density, low-density, linear-low-density, or other known types of polyethylene. In some embodiments, the same polymer in different layers is substantially identical in material aspects.

In embodiments, at least one of the spunbond polyolefin layer of first layer 14 or the nonwoven olefin layer of second layer 16 includes at least one of polypropylene, polyethylene terephthalate, high-density polyethylene, low-density polyethylene, or linear low-density polyethylene.

In certain embodiments, first layer 14 consists of or consists essentially of the spunbond polyolefin layer. In certain embodiments, second layer 16 consists of or consists essentially of the nonwoven polyolefin layer. In certain embodiments, the spunbond polyolefin layer and the nonwoven polyolefin layer consist essentially of a same polyolefin.

In certain embodiments, the nonwoven polyolefin layer of second layer 16 is a spunlace polyolefin layer. In other embodiments, the nonwoven polyolefin layer of second layer 16 is a needlepunched polyolefin layer.

While first layer 14 may consist of a single layer as shown in FIG. 2, in other embodiments, the first layer may include sublayers.

Figure 3:
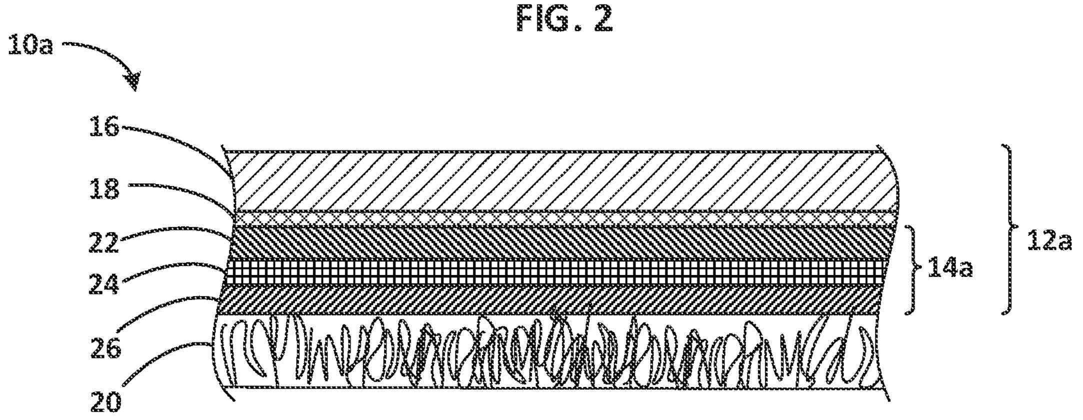
FIG. 3 is a partial cross-section view of a sound control mat including a fabric composite and an entangled mesh layer, where the fabric composite includes a spunbond-meltblown-spunbond first layer and a second layer.

For example, FIG. 3 is a partial cross-section view of a sound control mat 10*a* including a fabric composite 12*a* and entangled mesh layer 20, where fabric composite 12*a* includes a spunbond-meltblown-spunbond first layer 14*a* and second layer 16. Fabric composite 12*a* is similar to composite 12 described with reference to FIG. 2, and differs in the configuration of the first layer 14*a*. Unless described as being different, similarly numbered elements of fabric composite 12*a* may be substantially the same as corresponding numbered elements of fabric composite 12.

In embodiments, first layer 14*a* includes a first sublayer 22 including a first spunbond polyolefin layer. The first spunbond polyolefin layer of first sublayer 22 may be similar to the first spunbond polyolefin layer of layer 14 described with reference to FIG. 2. First layer 14*a* further includes a second sublayer 24 including a meltblown polyolefin layer, and a third sublayer 26 including a second spunbond polyolefin layer. Second sublayer 24 is between first sublayer 22 and third sublayer 26. In certain embodiments, first sublayer 22 is a top sublayer, for example, the sublayer facing hot-melt adhesive layer 18, and ultimately facing an underlayment. In such embodiments, second sublayer 24 is a middle layer, and third sublayer 26 is a bottom layer, facing entangled mesh layer 20.

Third sublayer 26 may be similar in structure and composition to first sublayer 22, or may differ from first sublayer 22. In certain embodiments, the first spunbond polyolefin layer of first sublayer 22 and the second spunbond polyolefin layer of third sublayer 26 consist essentially of a same polyolefin.

In embodiments, the meltblown polyolefin layer of the second sublayer 24 is a first meltblown polyolefin layer, and wherein first layer 14*a* further includes a second meltblown polyolefin layer (not shown) between first sublayer 22 and second sublayer 24. The first meltblown polyolefin layer may be similar in structure and composition to the second meltblown polyolefin layer, or may differ from meltblown polyolefin layer.

In certain embodiments, at least one of the first spunbond polyolefin layer of first sublayer 22, the second spunbond polyolefin layer of third sublayer 26, or the meltblown polyolefin layer of second sublayer 24 includes at least one of polypropylene, polyethylene terephthalate, high-density polyethylene, low-density polyethylene, or linear low-density polyethylene. In certain embodiments, the second spunbond polyolefin layer of third sublayer 26 and the meltblown polyolefin layer of second sublayer 24 consist essentially of a same polyolefin.

In certain embodiments, (1) the first spunbond polyolefin layer of first sublayer 22 includes at least one of polypropylene, polyethylene terephthalate, high-density polyethylene, low-density polyethylene, and linear low-density polyethylene, (2) the meltblown polyolefin layer of second sublayer 24 includes at least one of polyethylene terephthalate, high-density polyethylene, low-density polyethylene, and linear low-density polyethylene, and (3) the second spunbond polyolefin layer of third sublayer 26 includes at least one of polyethylene terephthalate, high-density polyethylene, low-density polyethylene, and linear low-density polyethylene. In some such embodiments, nonwoven polyolefin layer of second layer 16 includes at least one of polypropylene, polyethylene terephthalate, high-density polyethylene, low-density polyethylene, and linear low-density polyethylene.

In certain embodiments, first layer 14*a* includes from about 10% to about 50% of first sublayer 22 by weight, from about 10% to about 50% of second sublayer 24 by weight, and from about 10% to about 50% of third sublayer 26 by weight.

The weight and weight ratio of the sublayers was found to affect the hydrostatic head pressure water resistance of the overall composite. In certain embodiments, first sublayer 22 has a basis weight from 15 to 20 grams per square meter (gsm). In certain embodiments, the first sublayer has a basis weight from 16 to 18.5 gsm. In certain embodiments, second sublayer 24 has a basis weight from 7 to 9 gsm. In certain embodiments, the second sublayer has a basis weight from 8 to 8.1 gsm. In certain embodiments, third sublayer 26 has a basis weight from 15 to 20 gsm. In certain embodiments, the third sublayer has a basis weight from 16 to 18.5 gsm. Of course, additional or alternative basis weights and/or weight ratios may be considered acceptable outside non-limiting exemplary ranges described above.

In certain embodiments, second layer 16 of fabric composite 12 or 12*a* has a basis weight from 20 to 70 gsm. In certain embodiments, second layer 16 has a basis weight from 35 to 50 gsm.

Hot-melt adhesive layer 18 may include any suitable hot-melt adhesive, for example, a hot-melt adhesive that melts at a temperature suitable for use with first layer 14 or 14*a* and second layer 16. In certain embodiments, hot-melt adhesive layer 18 includes a thermoplastic. In some such embodiments, hot-melt adhesive layer 18 consists essentially of the thermoplastic. The thermoplastic may include at least one of polypropylene, amorphous poly-alpha-olefin (APAO), a butene-1 copolymer, modified t-APAO, ethyl vinyl acetate, and polyurethane. In certain embodiments, the thermoplastic is selected from a group consisting of polypropylene, amorphous poly-alpha-olefin (APAO), a butene-1 copolymer, modified t-APAO, ethyl vinyl acetate, and polyurethane. The polyurethane may be a hot-melt reactive polyurethane.

Hot-melt adhesive layer 18 may promote bonding of first layer 14 or 14*a* and second layer 16, such that the layers of fabric composite 12 or 12*a* may resist peeling or separation. For example, first layer 14 or 14*a* may exhibit a bond with second layer 16 having a bond strength according to a T-peel method (ASTM 1876-08) of at least 0.5 lbf. In some such embodiments, first layer 14 or 14*a* exhibits a bond with second layer 16 having a bond strength according to a T-peel method (ASTM 1876-08) of at least 1 lbf. Of course, additional or alternative bond strengths may be considered acceptable outside non-limiting exemplary ranges described above.

One or more layers of fabric composite 12 or 12*a* may exhibit water resistance. For example, first layer 14 or 14*a* may exhibit water uptake in the amount of less than 50% water absorption after 5-second submersion. In certain embodiments, first layer 14 or 14*a* exhibits water uptake in the amount of from 0 to 25% water absorption after 5-second submersion.

One or more layers of fabric composite 12 or 12*a* may promote bonding with an underlayment layer poured on mat 10 or 10*a*. For example, second layer 16 may exhibit a bond with poured cured gypsum having a bond strength of at least 10 lbf. In some such embodiments, second layer 16 exhibits a bond with poured cured gypsum having a bond strength of at least 50 lbf. In some such embodiments, second layer 16 exhibits a bond with poured cured gypsum having in a bond strength of at least 70 lbf.

The construction and arrangement of layers and/or sublayers of fabric composite 12 or 12*a* may provide intrusion or pressure resistance to the composite as a whole. For example, fabric composite 12 or 12*a* may exhibit a hydrostatic head resistance (AATCC 1270-1985 Option 2) of from 4 to 40 inches of water. In some embodiments, fabric composite 12 or 12*a* exhibits a hydrostatic head resistance (AATCC 1270-1985 Option 2) of more than 8 inches of water. In some such embodiments, fabric composite 12 or 12*a* exhibits a hydrostatic head resistance (AATCC 1270-1985 Option 2) of more than 20 inches of water.

Fabric composites and sound control mats according to the present disclosure may provide water resistance and intrusion resistance even in the absence of water repellent agents or treatment, for example, in the absence of halogenated agents, such as fluoropolymers, per- and polyfluoroalkyl substances (PFAS), perfluorooctanoic Acid (PFOA), or perfluorooctanesulfonic acid (PFOS).

In certain embodiments, fabric composite 12 or 12*a* is free of any halogenated agent. For example, no halogenated agent is present in fabric composite 12 or 12*a*. The term halogenated agent includes halogenated compounds or halogenated polymers, for example, fluorinated, chlorinated, or fluorochlorinated agents. In certain embodiments, no more than a trace amount of halogenated agent is present in fabric composite 12 or 12*a*.

Thus, fabric composites according to the present disclosure may be used in sound control mats, for example, sound control mats 10 or 10*a*. In embodiments, sound control mats 10 or 10*a* may be a gypsum underlayment sound control mat.

In certain embodiments, sound control mat 10 or 10*a* includes fabric composite 14 or 14*a*, and entangled mesh layer 20. In some such embodiments, fabric composite 14 or 14*a* is bonded to entangled mesh layer 20, for example, thermally, electrically, or chemically bonded. In certain embodiments, entangled mesh layer 20 includes a nonwoven polyolefin layer. The nonwoven polyolefin layer may include polypropylene. Entangled mesh layer 20 may act as a sound dampening layer and may attenuate sound passing from flooring 150 through gypsum underlayment 140 and subfloor 110 through panel 130 to an adjacent room or unit. For example, a thickness, density, or entanglement of mesh layer 20 may attenuate sound waves.

Mesh layer 20 may be a bottom layer relative to underlayment 140. For example, fabric composite 14 or 14*a* may be between mesh layer 20 and underlayment 140.

Further, second layer 16 may be a top layer relative to mesh layer 20. For example, first layer 14 or 14*a* may be between second layer 16 and entangled mesh layer 20, with second layer 16 facing underlayment 140.

Fabric composite 12 or 12*a* and sound control mat 10 or 10*a* may be used in flooring system 100. For example, flooring system 100 may include fabric composite 12 or 12*a* as described with reference to FIG. 2 or 3, and a gypsum or gypsum-concrete underlayment 140 poured and cured over fabric composite 12 or 12*a*. In certain embodiments, flooring system 100 includes mat 10 or 10*a* as described with reference to FIG. 2 or 3, for example, over subfloor 110, and with gypsum or gypsum-concrete underlayment poured and cured over fabric composite 12 or 12*a* of mat 10 or *a*. In some such embodiments, second layer 16 may be between first layer 14 and underlayment 140. Likewise, flooring system 100 may further include subfloor 110, with fabric composite 12 or 12*a* between underlayment 140 and subfloor 110.

Flooring systems according to the present disclosure may exhibit a measurable reduced and effective sound dampening. For example, flooring system 100 may exhibit an Impact Isolation Class (IIC) (ASTM E492/E989) of 50. In some embodiments, flooring system 100 exhibits an IIC of 55. In some embodiments, flooring system 100 exhibits an IIC of 60. In some embodiments, flooring system 100 exhibits a Sound Transmission Class (STC) (ASTM E336/E413) of 50. In some embodiments, flooring system 100 exhibits an STC of 55. In some embodiments, flooring system 100 exhibits an STC of 60.

Fabric composites and sound control mats according to the present disclosure may be used to dampen sound transmission across or through a subfloor or flooring system, for example, into an adjacent (for example, vertically above or below) room or unit. In embodiments, a method for dampening sound transmission across a subfloor includes laying a mat 10 or 10*a* over subfloor 110, and pouring a gypsum underlayment 140 over mat 10 or 10*a*.

Fabric composites and mats according to the disclosure may be formed using any suitable techniques. In embodiments, a method for forming fabric composite 12 or 12*a* includes applying hot-melt adhesive 18 between first layer 14 or 14*a* and second layer 16. In embodiments, a method for forming mat 10 or 10*a* includes bonding fabric composite 12 or 12*a* to entangled mesh layer 20.

Techniques and Test Methods

According to various embodiments, laboratory test methods were used in evaluating laboratory and trial products. These test methods included firstly a hydrostatic head test (AATCC 127-1985 Option 2), which measured water resistance in inches of water using a HydroTester Unit FX 3000-IV from TexTest AG (Schwerzenbach, Switzerland). Also conducted were thickness tests such as ASTM D5199-12 procedure A, which determines thickness of sound mat and fabrics via weighted presser foot with MTG DX2 gauge with MTG-56.4 mm foot and MTG-423 g wt. from Electromatic Equipment Co, Inc. (Cedarhurst, New York). Weight fabric tests such as ASTM D3776 were utilized, whereby the basis weight of fabric is evaluated by cutting a 100 cm2 circle with Metric Sample Cutter, Model: ILE-CFC-100 from Industrial Laboratory Equipment Co. (Charlotte, North Carolina) and analytical balance that can measure to 0.0001-grams. Weight of sound mat tests, such as ASTM D5661-10, which determines mass per unit area of sound mat with Ohaus Ax4202 laboratory balance (Parsippany, New Jersey) were also conducted; along with T-peel tests (ASTM D1876-08) to determine the peel strength of adhesive bonds between flexible adherends tested at an angle of 180-degrees with Mark 10 Test Machine and Tensile Grip Fixtures from Mark 10 Corporation (Copiague, New York); and a 90-degree Tape Peel Testing from Fabric (ASTM D6862-11), which determines the resistance to peel strength of tape from fabric when tested at an angle of 90-degrees using the Mark 10 Machine and peel test fixtures for Mark 10 Corporation.

The percentage (%) moisture content of sound mat was determined using the following technique: (1) cut two (2) 5"×5" specimens across each 5' split roll (4 total); (2) a guillotine paper cutter or similar apparatus with guide or jig was used for accurate measurements; (3) same samples were used for thickness and compressive strength tests; (4) immediately after the sample is cut, the sample was weighed and recorded to the nearest 0.001 oz; (5) samples were placed into 110° F. oven and dried to constant weight; (6) each of the dry specimens was weighed; and (7) the % MC (moisture content) was calculated per EQUATION 1 immediately below.

$$\% \, MC = \frac{((Wt. \text{ of wet specimen (oz)} - Wt. \text{ of dry specimen (oz)})}{(Wt. \text{ of dry specimen (oz)))} * 100}$$

Gypsum Bond was determined by a technique which measures the bond strength of sound mat fabrics to gypsum. The technique includes steps as below:

13. 1242 g Gyperete 2000, 2808 g dry sand, and 694 g water were mixed using mixing bowl and spatula.
14. Water was adjusted as needed for 9-inch slump.
15. Sound mat was placed in each mold, polymer side down and fabric side up.
16. Eight molds were used, ¾"×3⅞"×5⅞".
17. After waiting 2-hours to complete hydration at room temperature, samples were removed from molds and placed in 110° F. oven over night.
18. Samples were removed the next day from the oven. Samples were not left in oven over 24-hours.
19. Samples were placed in a conditioning chamber for 24-hours at ~70-deg F./50% RH.
20. Only the set being tested was removed from environmental chamber. Testing was completed within 30-minutes of removing from environmental chamber.
21. On the eight samples, 1⅛" from the leading end, cut through approximately ½ the thickness of the gypsum with a plunge circular saw concrete blade of 1/16" thickness.
22. Anvil was brought down on the United Tester (Universal Testing Machine) 1" from edge of the test jig.
23. The United Tester program was run to failure.
24. The load at failure was recorded in lbf, and failure mode was recorded.

A percentage (%) of Water Absorption of fabrics (% WA) was also determined using a technique whereby: (1) five 4"×4" pieces of fabric (±1/16") evenly spaced across full 124" width of fabric were cut; (2) water at 70° F.±2 was poured into test bowl to a 3" depth; (3) each 4" sample of fabric was folded in half with the needle punch side out, which allows sample to fit on scale for best accuracy; (4) each sample was weighed on scale and record each to the nearest 0.001 g accuracy. Recorded as $\text{Weight}_{initial}$; and (5) folded samples were pinched at edges and fully immersed into water for 5 seconds; (6) the sample was removed after 5 seconds, and water was allowed to drip back into bowl for 5 seconds; (7) while dripping the sample was gently shaken to remove the largest beaded drops of water; (8) the wet sample was immediately placed onto a scale and weigh to 0.001-gram accuracy, as $\text{Weight}_{final}$; (9) the % Water Absorption was calculated using EQUATION 2 below; and (10) the average was reported.

$$((\text{Weight}_{final} - \text{Weight}_{initial}) / \text{Weight}_{initial}) * 100 \qquad \text{(Equation 2)}$$

A total of 16 different laboratory experiments and trials involving around 60 different individual components were conducted to find the suitable composites to meet required manufacturing and end use properties. Exemplary results and details surrounding some of these are provided below.

Example 1

The purpose of this experiment was to make laboratory composites using a top fabric and bottom fabric bonded together with a polypropylene hotmelt adhesive. Top fabrics were either polypropylene spunlace or polypropylene needlepunch. Bottom fabrics were from two different sources of polypropylene Spun-Melt-Spun (SMS). A polypropylene hotmelt fabric (DHM #A-1318) at ~20 gsm was used to bond fabrics together.

Earlier experiments had identified these components (fabrics and adhesive) as leading candidates based on gypsum and tape bond testing, water absorption properties, hydrostatic head, and T-peel testing. It was a hypothesis of these experiments that a lower basis weight top fabric could be used.

The thickness, weight, and water absorption properties were tested on individual components first. Then components were glued together with the PP hotmelt adhesive using laboratory hotmelt spray and nip equipment. The composites were tested for weight, thickness, % water absorption, hydrostatic head, and gypsum bond. The results indicated composite S1 made with 35 gsm spunlace had the lowest water absorption 53%. Compared to a control of 34%. There was no statistical difference between S1 gypsum bond and control. The hydrostatic head results were a little lower for S1 but higher than the target needed to prevent slurry penetration into the airgap (preferred 12, greater than 8 minimum).

Figure 4:
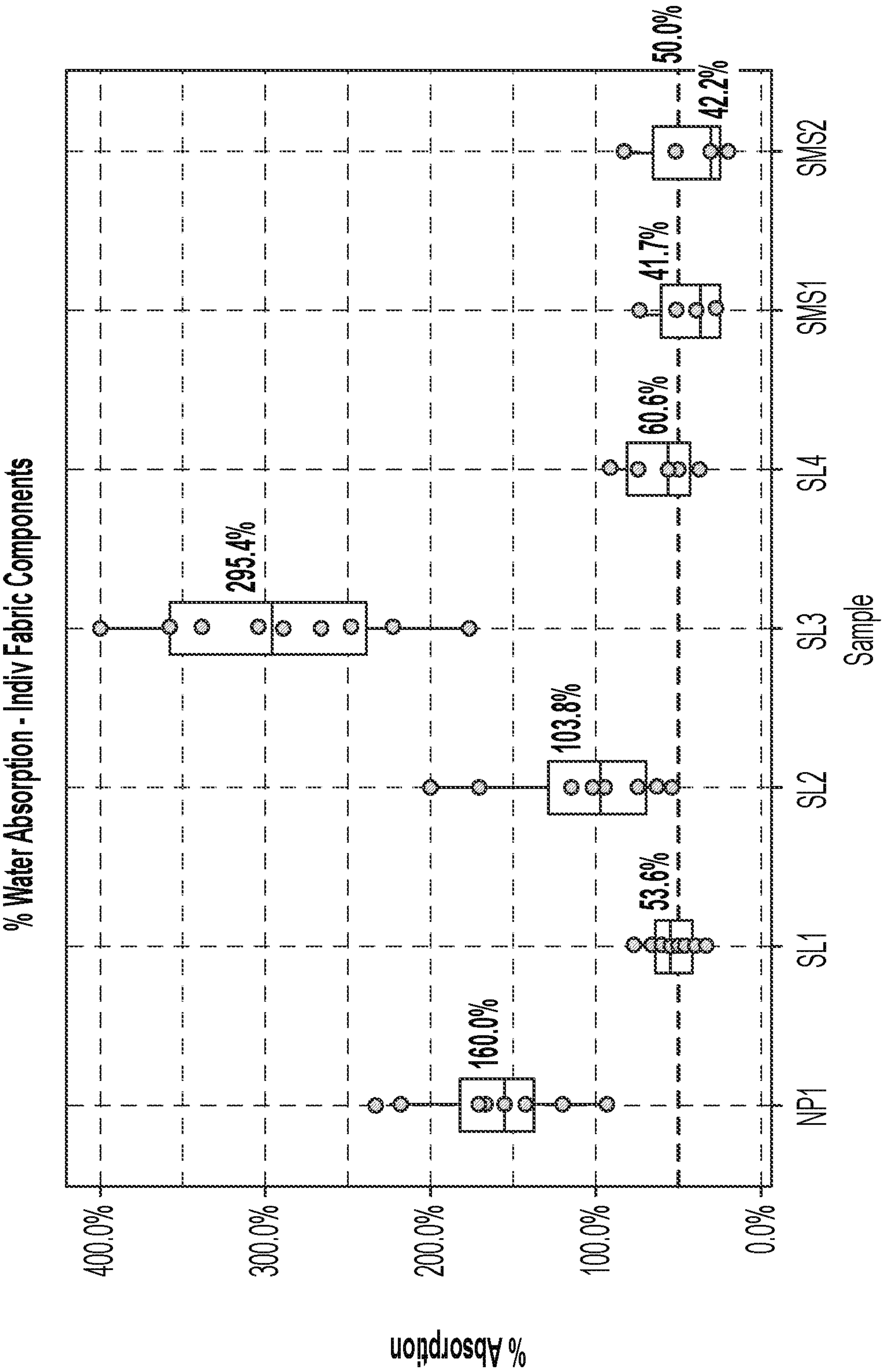
FIG. 4 is a chart representing water absorption of sample individual fabric components.
Figure 5:
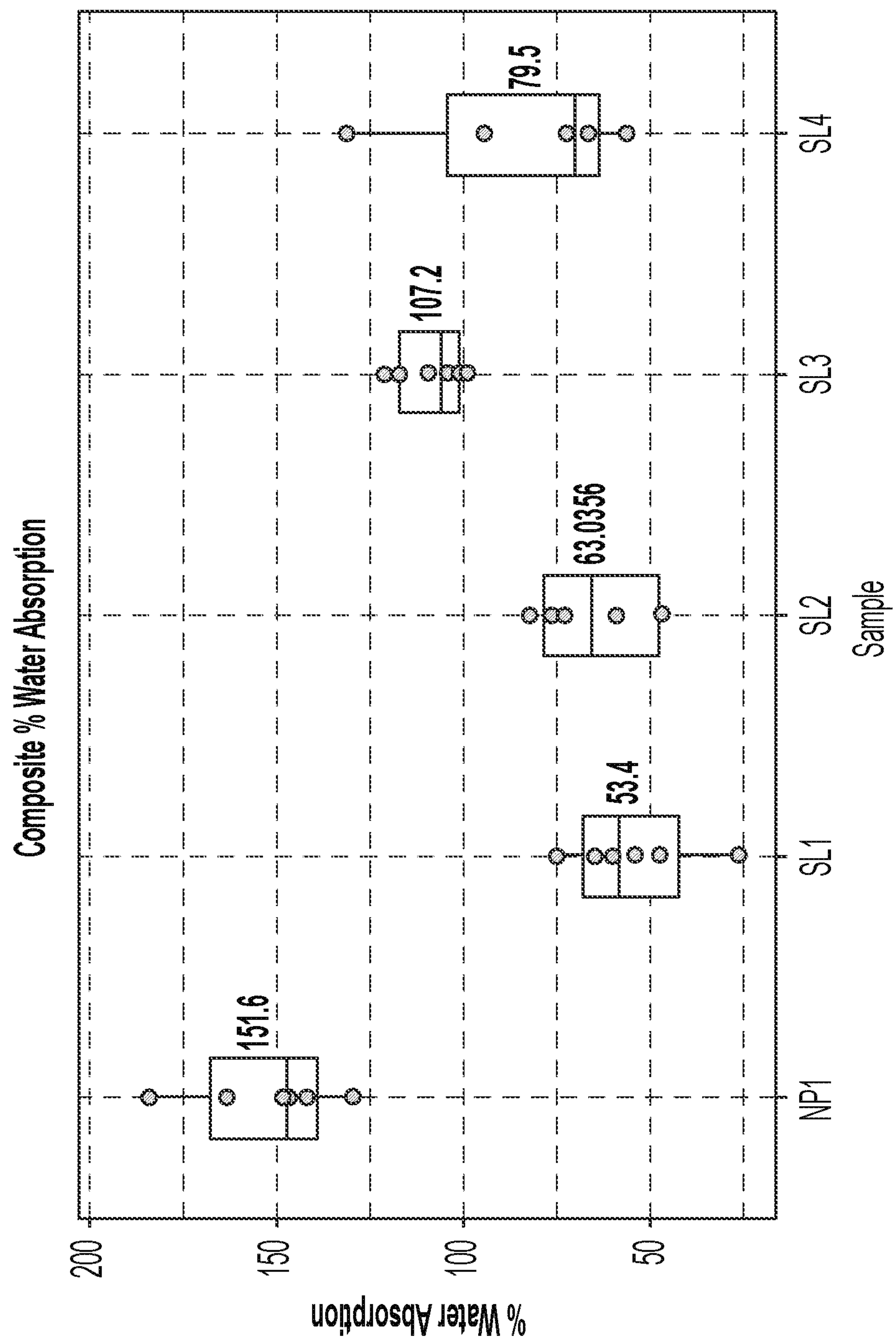
FIG. 5 is a chart representing water absorption of sample fabric composites.
Figure 6:
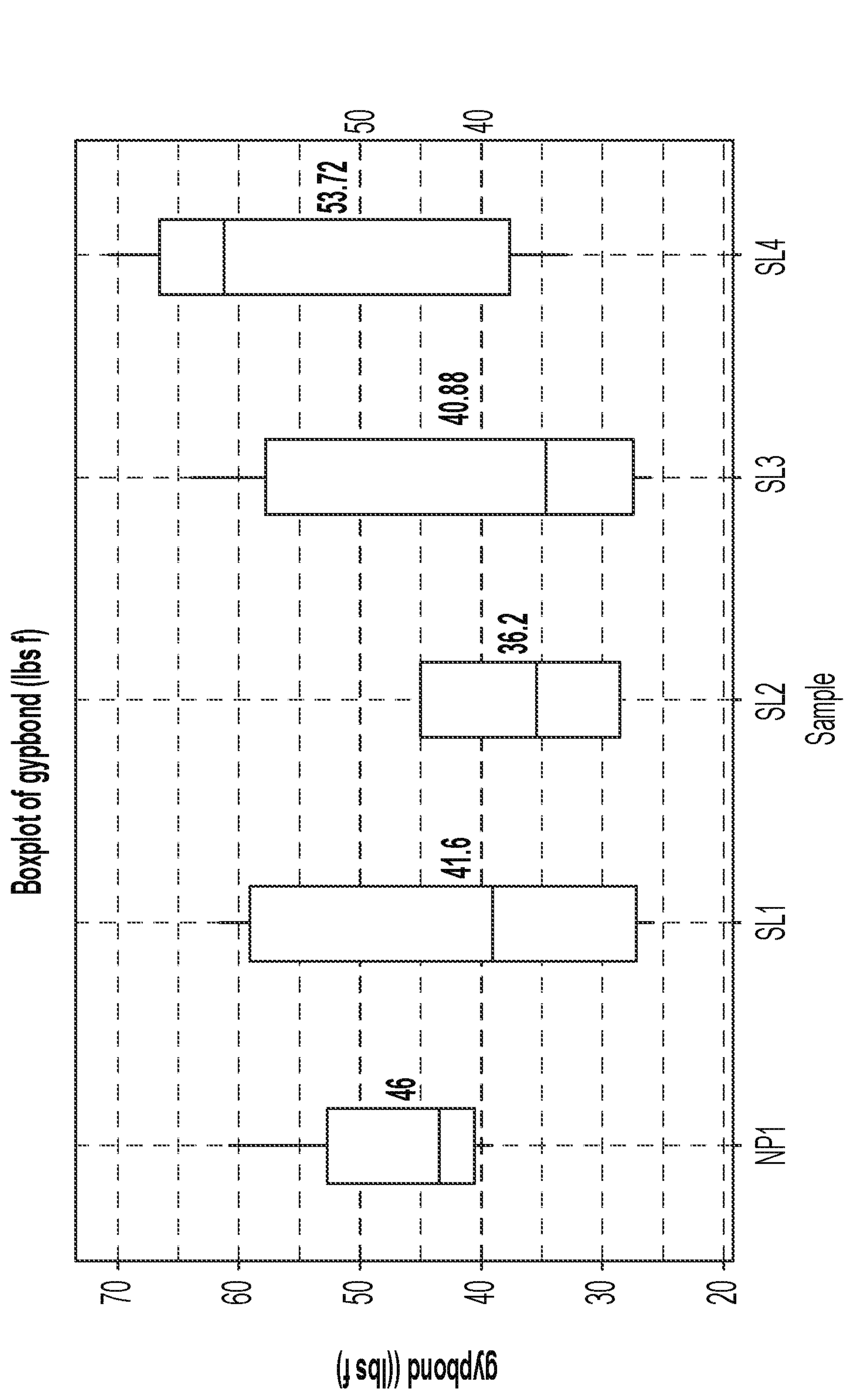
FIG. 6 is a chart representing gypsum bonding of sample fabric composites.

For purposes of comparison, FIG. 4 contains data points representing water absorption of sample individual fabric components; FIG. 5 represents water absorption of sample fabric composites; and FIG. 6 represents gypsum bonding of sample fabric composites. The results informed by the charts of FIGS. 4-6 and based on the experiment of EXAMPLE 1 are shown in TABLES 1 to 3 below.

Test Results Individual Components

TABLE 1 properties of sample top layers
Top Layer

| ID | Top Layer Description | Thick (in) | Wt (gsm) | % Water Absorption |
|---|---|---|---|---|
| SL1 | 35 gsm PP Spunlace | 0.018 | 31 | 53% |
| SL2 | 40 gsm PP Spunlace | 0.019 | 34 | 103% |
| SL3 | 40 gsm 70% PP/30% PET Spunlace | 0.019 | 40 | 295% |
| SL4 | 55 gsm PP NA Spunlace 55 gsm | 0.021 | 52 | 60% |
| NP1 | 55 gsm PP Needlepunch (Thailand) | 0.012 | 45 | 160% |

TABLE 2 properties of sample bottom layers
Bottom Layer

| ID | Top Layer Description | Thick (in) | Wt (gsm) | % Water Absorption |
|---|---|---|---|---|
| SMS1 | 50 gsm SMS (China) | 0.012 | 59 | 41% |
| SMS2 | 50 gsm PP Spunlace | 0.012 | 48 | 42% |

Lab Made Composites

TABLE 3 properties of sample composites compared with a control
Top & Bottom Layer + ~20 PP Adhesive

| ID | Top Layer Description | Bottom Layer | Wt (gsm) | Thick (in) | % WA | Hydrohead (in H20) | Gypbond (lbs-f) |
|---|---|---|---|---|---|---|---|
| SL1 | 35 gsm PP Spunlace | SMS1 | 110 | 0.017 | 54 | 25 | 42 |
| SL2 | 40 gsm PP Spunlace | SMS1 | 109 | 0.018 | 63 | 21 | 36 |
| SL3 | 40 gsm 70% PP/ 30% PET Spunlace | SMS1 | 110 | 0.020 | 107 | 17 | 40 |
| SL4 | 55 gsm PP NA Spunlace 55 gsm | SMS1 | 135 | 0.021 | 79 | 25 | 54 |
| NP1 | 55 gsm PP Needlepunch (Thailand) | SMS1 | 125 | 0.020 | 152 | 16 | 46 |
| Control | Current Trilam with DWR | | 101 | 0.015 | 34 | 35 | 43 |

Example 2

The purpose of this trial was to assess product manufactured dryness and end-use physical properties of 3 bi-laminated fabrics without DWR. The trial conditions are shown in TABLE 4.

TABLE 4

| composition of sample and control fabrics | | | |
|---|---|---|---|
| Test Code | Top Layer | Adhesive | Bottom Layer |
| A-2 Alt | 55 gsm PP Spunlace | DHM#1318 PP 20 gsm | 55 gsm PP SMS |
| D-2 | 35 gsm PP Spunlace | DHM#1318 PP 20 gsm | 55 gsm PP SMS |
| C-2 | 45 gsm PP Needlepunch Thailand | DHM#1318 PP 20 gsm | 55 gsm PP SMS |
| Control | | "Tri-lam control" | |

Testing of fabric retains indicated low water absorption on all the new composites, as seen in TABLE 5 below. The T-peel testing indicated good adhesion between layers. Gypsum bond was not statistically different from controls. Hydrostatic Head was lower but not in the range that would create issues with gypsum bleed through.

Summary: Fabric Trial Retains

TABLE 5

| properties of sample and control fabrics | | | | | | | | |
|---|---|---|---|---|---|---|---|---|
| | | | | T-peel Test | | | Gypsum Bond | |
| Test Code | Thick (in) | Wt (gsm) | % WA (avg) | T-peel (avg) | T-peel Wet (avg) | T-peel Hot (avg) | Fabric Only (lbs-f) | Hydrostatic Head (H20) |
| A-2 Alt | 0.019 | 117 | 10 | 3.7 | 3.1 | 5.4 | 43 | 24 |
| D-2 | 0.026 | 99 | 24 | 3.6 | 2.6 | 3.9 | 35 | 21 |
| C-2 | 0.025 | 114 | 51 | 0.5 | 0.8 | 0.4 | 56 | 20 |
| Tri-Lam Control | 0.019 | 100 | 28 | 1.8 | 2.0 | 1.2 | 36 | 42 |

Figure 7:
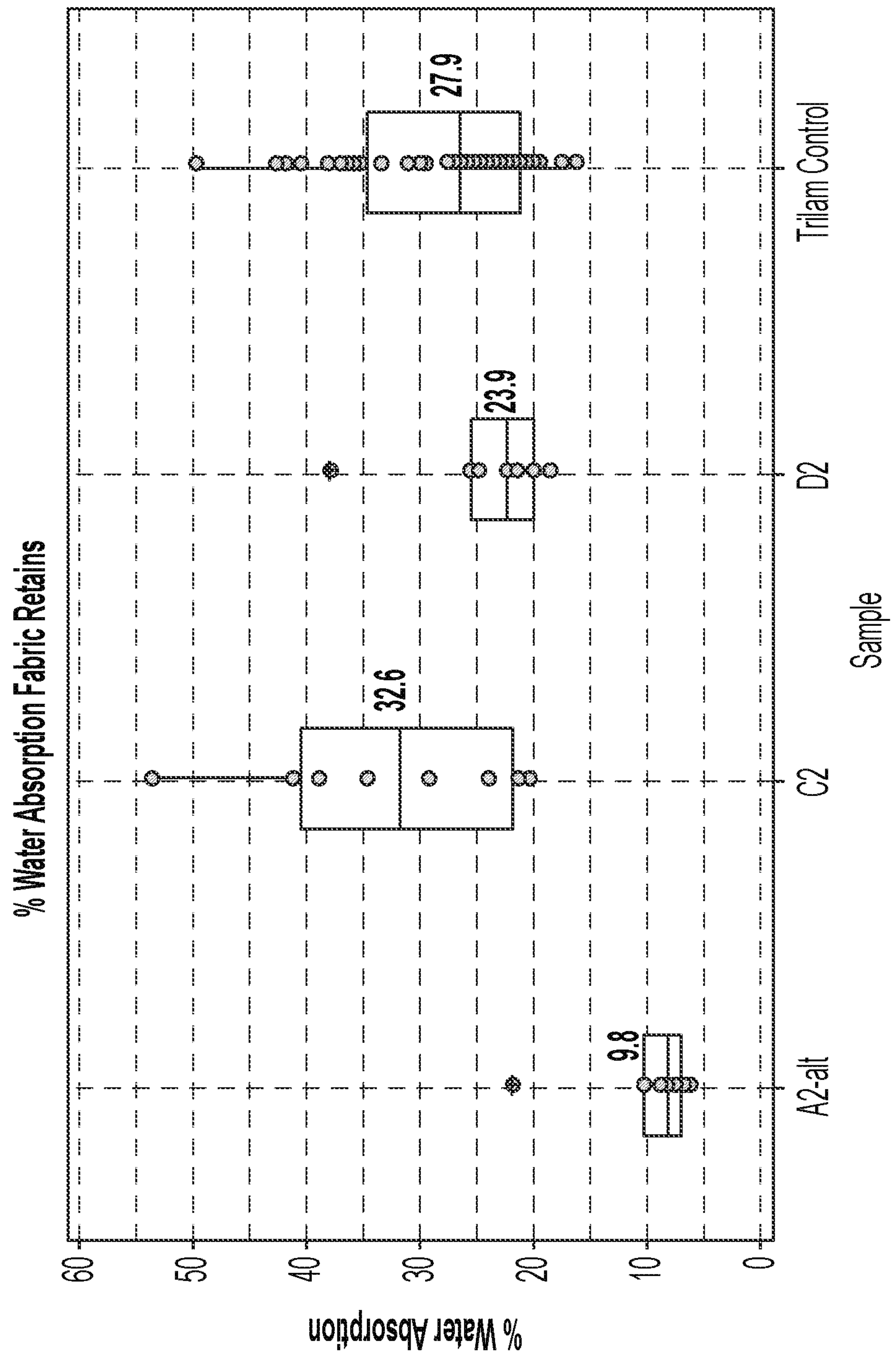
FIG. 7 is a chart representing water absorption of sample fabric composites including different gypsum contact layers without water repellant agent.
Figure 8:
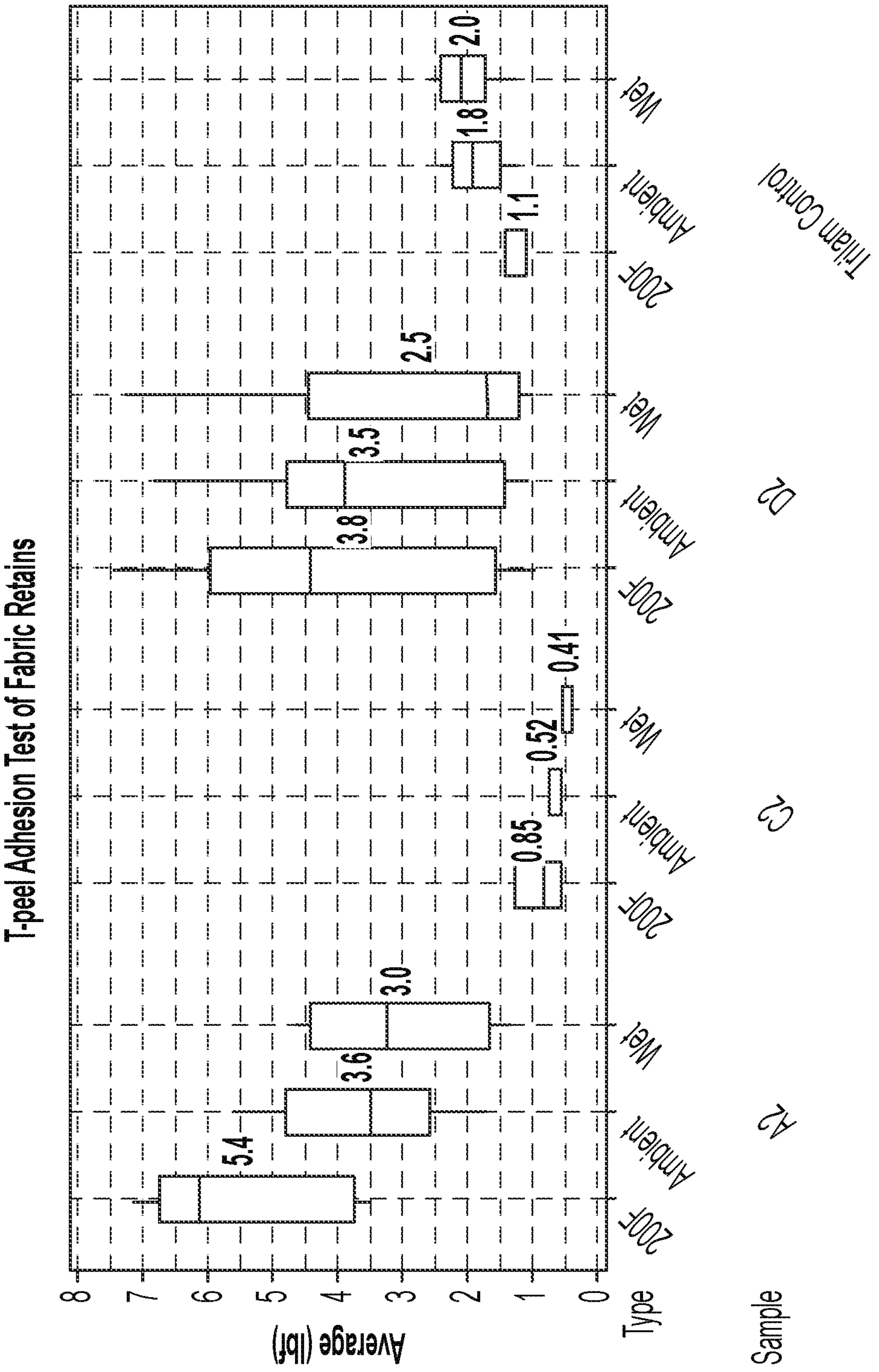
FIG. 8 is a chart representing bond strength between layers of sample fabric composites.
Figure 9:
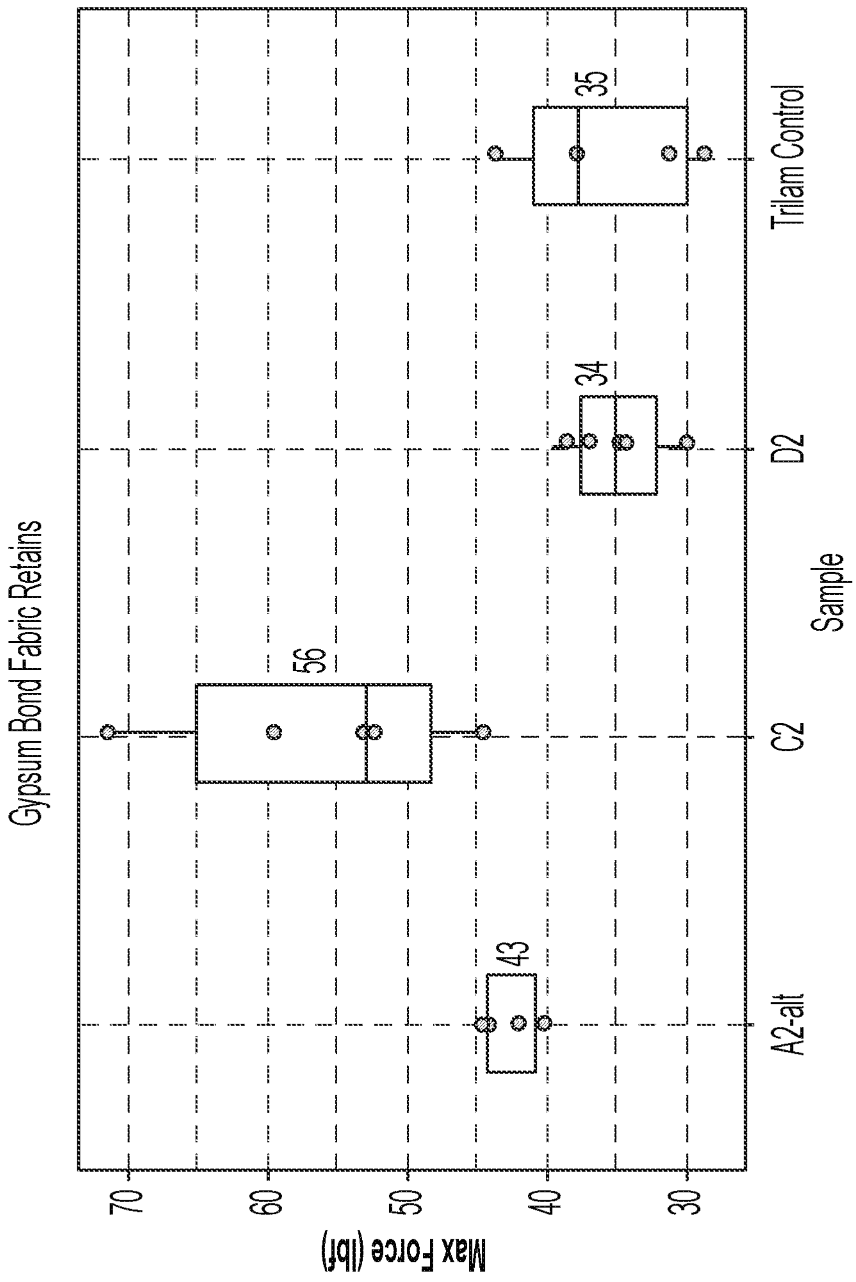
FIG. 9 is a chart representing gypsum bonding of sample sound control fabric composites including different gypsum fabric contact layers without water repellant agent.
Figure 10:
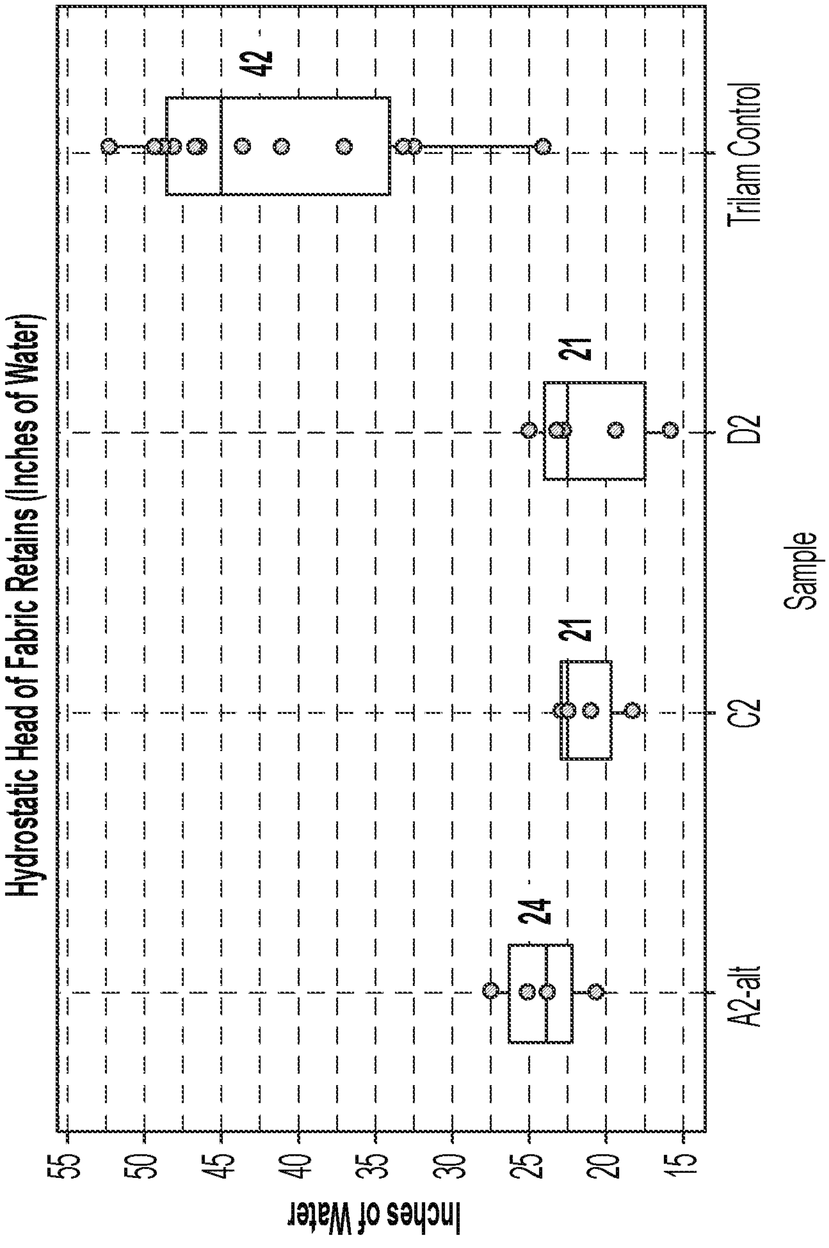
FIG. 10 is a chart representing hydrostatic head pressure exhibited by sample fabric composites including different gypsum fabric contact layers without water repellant agent.

Related data from this trial is also evident in the charts contained FIGS. 7-10. Specifically, FIG. 7 illustrates water absorption of sample fabric composites including different gypsum contact layers without water repellant agent. FIG. 8 illustrates observed bond strength between layers of sample fabric composites. FIG. 9 documents gypsum bonding of sample fabric composites including different gypsum fabric contact layers without water repellant agent. FIG. 10 represents data collected regarding hydrostatic head pressure exhibited by sample fabric composites including different gypsum fabric contact layers without water repellant agent.

Example 3

Through conducted tests, fabric testing of two different tapes indicated composites A2 alt and D2 had better adhesion to tape than the Tri-lam controls with DWR (minimum of >1-lb-f preferred), as seen in TABLE 6 below.

Fabric Only—90° Peel

TABLE 6

| tape adhesion properties of sample and control fabrics | | | | | | |
|---|---|---|---|---|---|---|
| | Ambient | | Cold 34 F. Application/Tested after 2 hrs at 34 F. | | | |
| | 4747 Tape (lbs-f) | Hi-cube B (lbs-f) | 4747 Tape (lbs-f) | Failure Mode | Hi-cube B (lbs-f) | Failure Mode |
| A2 alt | 3.6 | 1.7 | 3.4 | Tape | 2.8 | Tape |
| C2 | 1.6 | 0.74 | 1.4 | Tape | 0.9 | Tape |
| D2 | 5.1 | 2.8 | 3.5 | Tape | 2.7 | Tape |
| Trilam Control | 2.2 | 1.1 | 1.9 | Tape | 0.9 | Tape |

TABLE 6-continued

| tape adhesion properties of sample and control fabrics | | | | | | |
|---|---|---|---|---|---|---|
| | Ambient | | Cold 34 F. Application/Tested after 24 hrs | | | |
| | 4747 Tape (lbs-f) | Hi-cube B (lbs-f) | 4747 Tape (lbs-f) | Failure Mode | Hi-cube B (lbs-f) | Failure Mode |
| A2 alt | 3.6 | 1.7 | 2.8 | Tape | 2.2 | Tape |
| C2 | 1.6 | 0.74 | 1.0 | Tape | 0.9 | Tape |
| D2 | 5.1 | 2.8 | 4.2 | Tape/fabric | 3.3 | Tape |
| Trilam Control | 2.2 | 1.1 | 2.4 | Tape | 1.1 | Tape |

Figure 11:
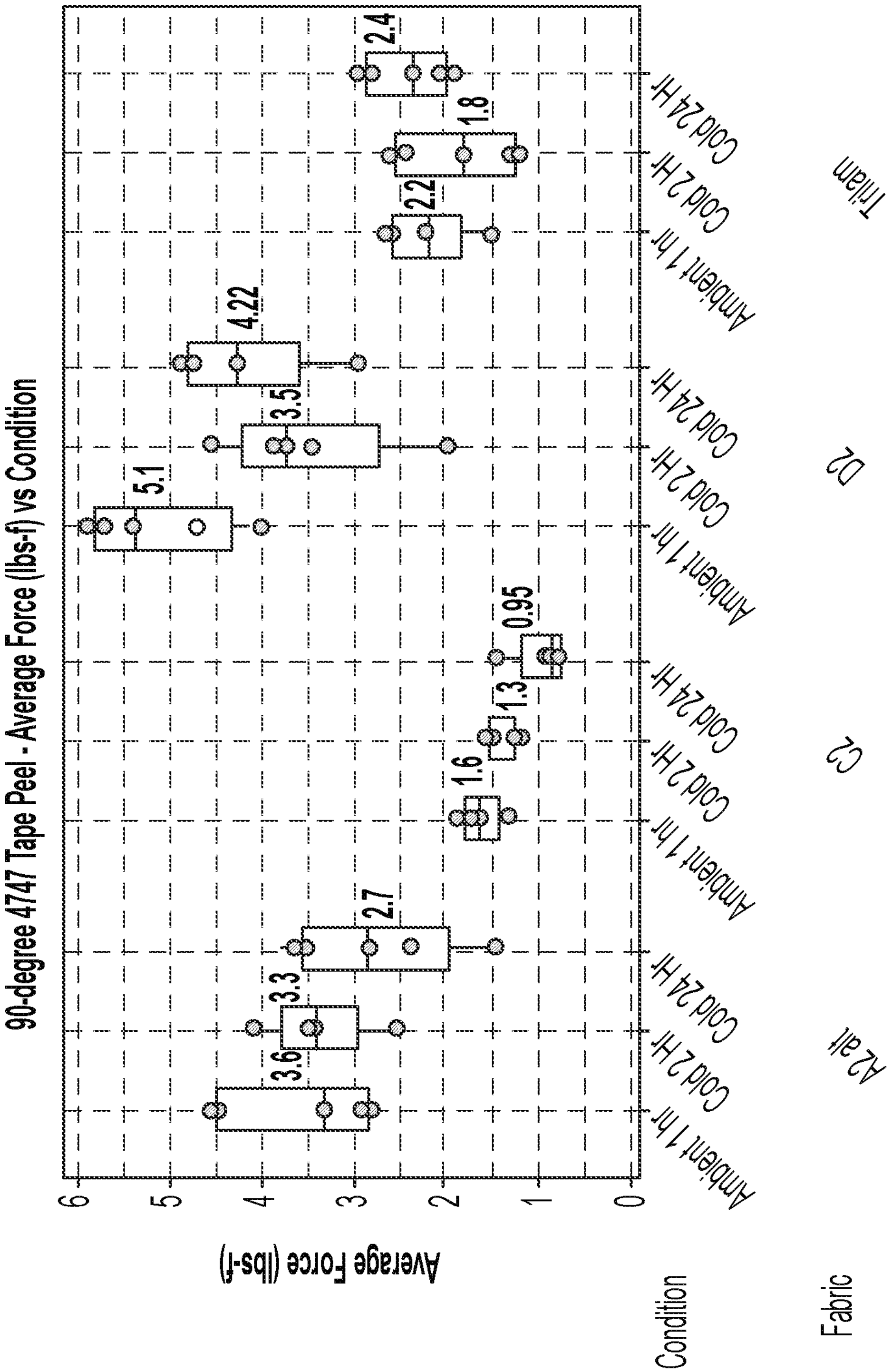
FIG. 11 is a chart representing a first tape peel adhesion exhibited by sample fabric composites including different gypsum fabric contact layers without water repellant agent.
Figure 12:
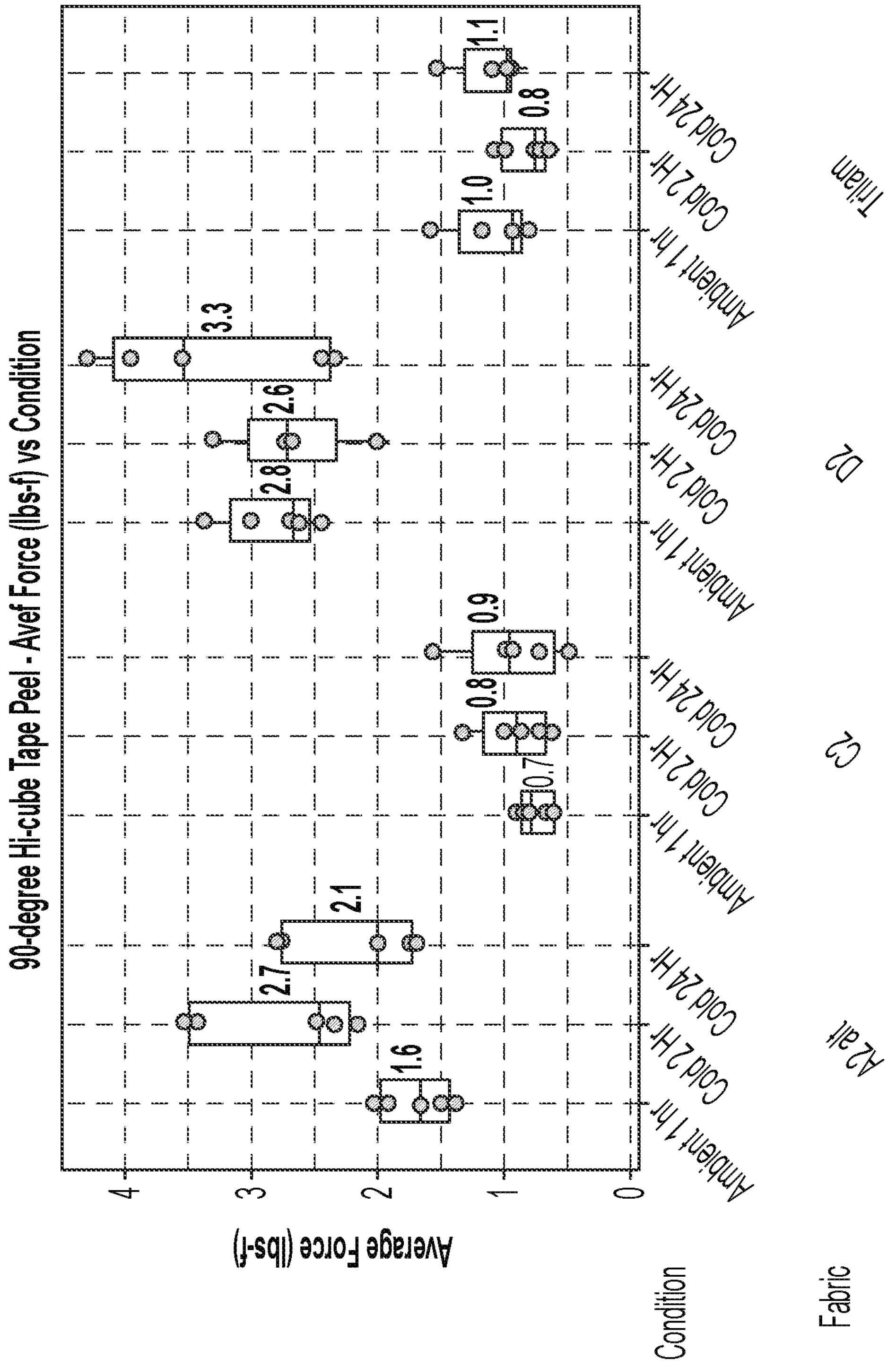
FIG. 12 is a chart representing a second tape peel adhesion exhibited by sample fabric composites including different gypsum fabric contact layers without water repellant agent.

Related to the tests conducted for EXAMPLE 3, data was collected. Specifically, FIG. 11 illustrates data representing a first tape peel adhesion exhibited by sample fabric composites including different gypsum fabric contact layers without water repellant agent, while FIG. 12 represents recorded observations of a second tape peel adhesion exhibited by sample fabric composites including different gypsum fabric contact layers without water repellant agent.

Example 4

Finished product testing at time of manufacture was also conducted and indicated the A2-alt and D2 fabrics were dry (to the touch) and around 1% moisture content, as seen in TABLE 7. 4-days later the product was measured at less than 1% moisture content. Hydrostatic head testing indicated no issue (above 8-inches of water minimum, >12-inches of water preferred). Gypsum bond testing indicated no issues (minimum >50-lbs force).

Trial Rolls

TABLE 7

| properties of rolls including sample and control fabrics | | | | | |
|---|---|---|---|---|---|
| | Moisture Content % as received middle and end of rolls next to core | Thickness inches | Hydrostatic Head inches of water | Gypsum Bond lbs-f | Gypsum Bond Failure Mode |
| A2 alt | 0.2 | 0.247 | 19 | 67 | fabric + gypsum |
| C2 | 0.1 | 0.246 | 10 | 74 | fabric + gypsum |
| D2 | 0.4 | 0.246 | 18 | 68 | fabric + gypsum |
| Trilam Control | — | — | 42 | 63 | fabric + gypsum |
| Current Spec | <5.0% | 0.22-0.29 | >15 | >50-lbs f | |

Figure 13:
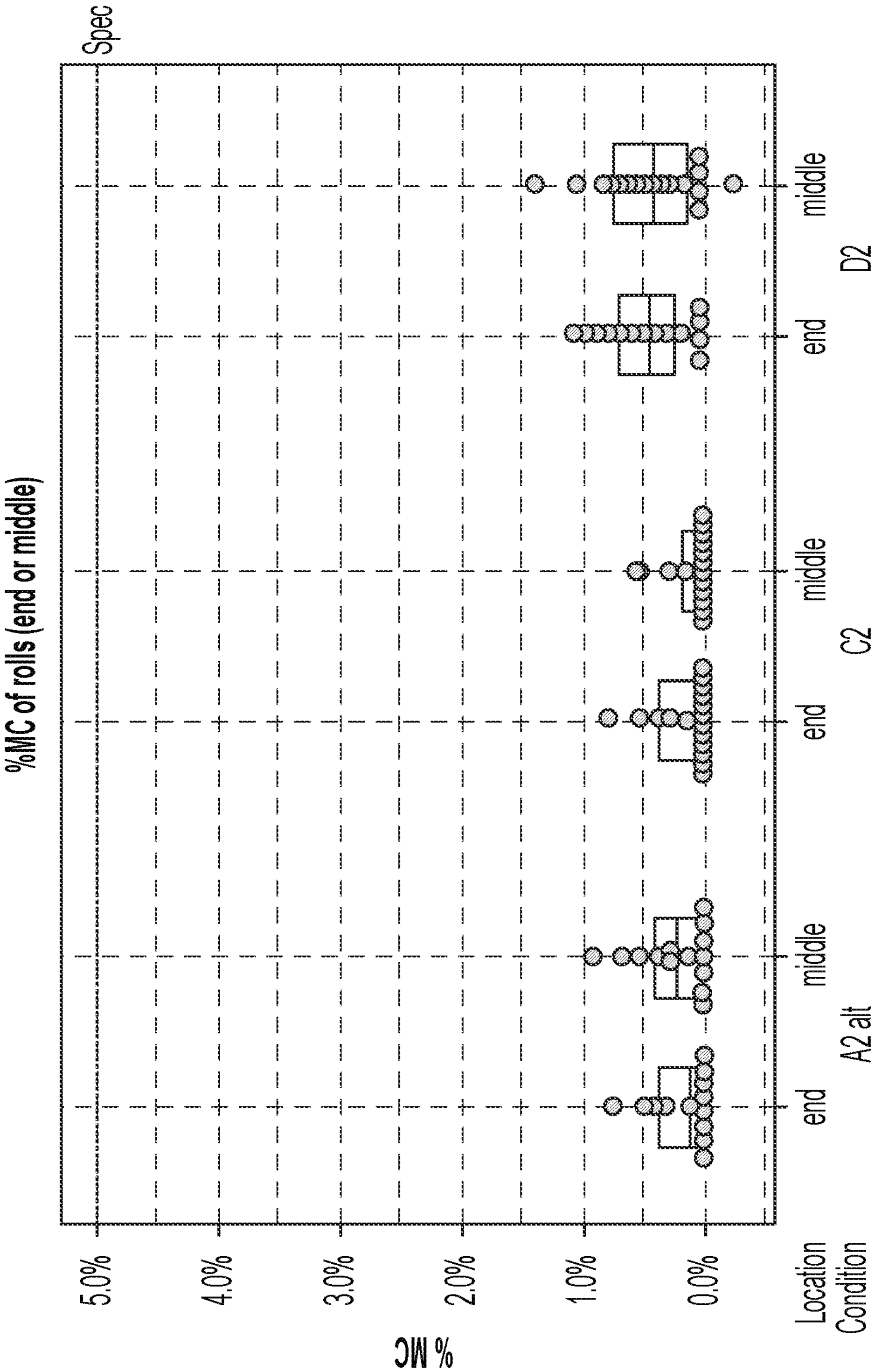
FIG. 13 is a chart representing moisture content of rolls of sample finished sound control mats (entangled mesh and composite fabric), tested four days after production.
Figure 14:
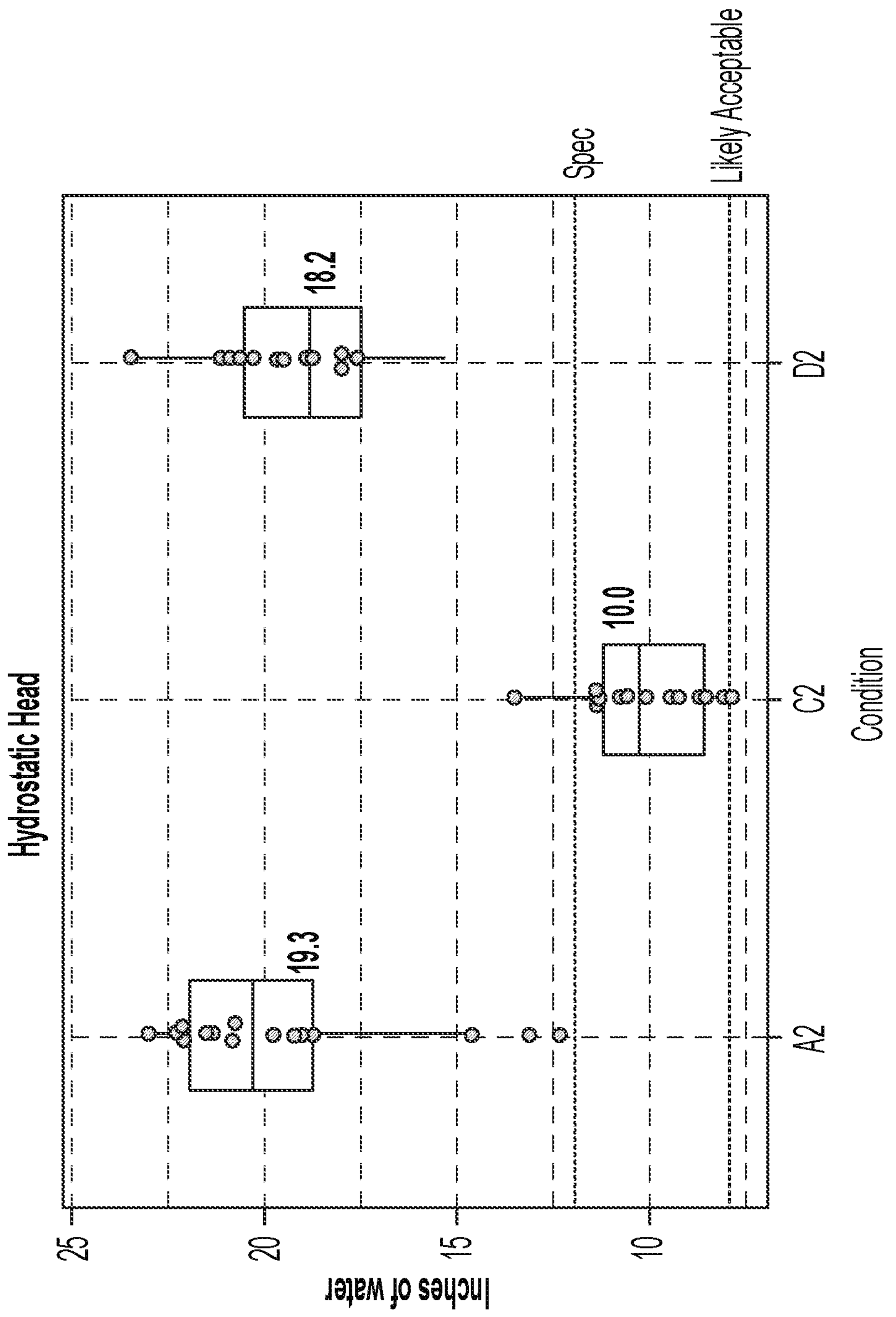
FIG. 14 is a chart representing hydrostatic head of sample sound control mats.
Figure 15:
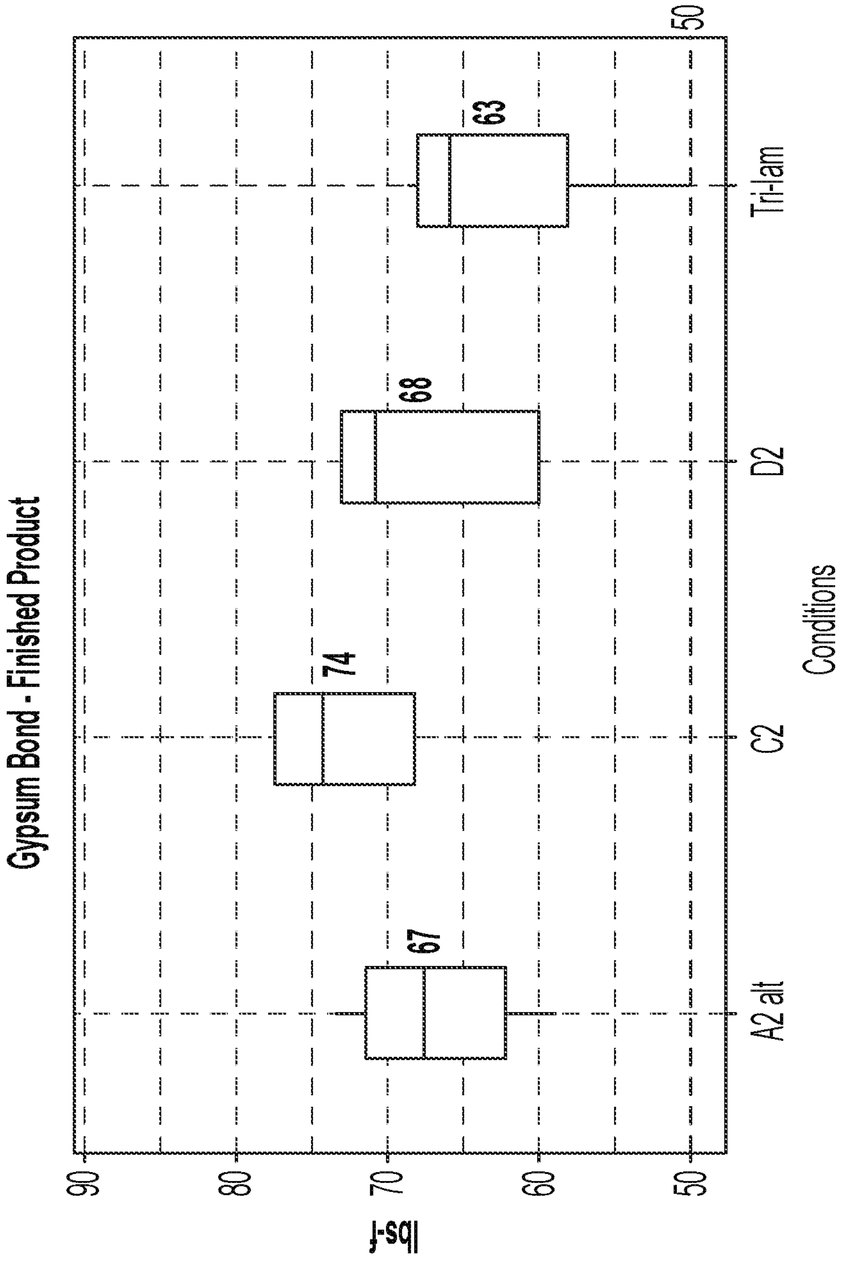
FIG. 15 is a chart representing gypsum bonding of sample sound control mats.

Relative to the finished product testing, FIG. 13 illustrates moisture content of rolls of sample finished sound control mats (entangled mesh and composite fabric), tested four days after production, while FIG. 14 represents hydrostatic head of rolls of sample sound control mats and FIG. 15 documents gypsum bonding of sample sound control mats.

Conclusion

While the present disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims

The invention claimed is:

1. A fabric composite, the fabric composite comprising:
- a first layer comprising a spunbond polyolefin layer;
- a second layer comprising a nonwoven polyolefin layer that is a spunlace polyolefin layer; and
- a hot-melt adhesive layer between and bonding the first layer and the second layers, wherein:
  - the spunlace polyolefin layer provides a mechanical bond with a gypsum layer poured and cured on the spunlace polyolefin layer, such that the mechanical bond therebetween has a gypsum bond value greater than 50 lb-ft and no more than 74 lb-ft; and
  - the fabric composite is free of any halogenated agent.

2. The fabric composite of claim 1, wherein at least one of the spunbond polyolefin layer or the nonwoven olefin layer comprises at least one of polypropylene, polyethylene terephthalate, high-density polyethylene, low-density polyethylene, or linear low-density polyethylene.

3. The fabric composite of claim 1, wherein the spunbond polyolefin layer is a first spunbond polyolefin layer, wherein the first layer comprises:
- a first sublayer comprising the first spunbond polyolefin layer,
- a second sublayer comprising a meltblown polyolefin layer, and
- a third sublayer comprising a second spunbond polyolefin layer, and
- wherein the second sublayer is between the first sublayer and the second sublayer.

4. The fabric composite of claim 3, wherein the meltblown polyolefin layer is a first meltblown polyolefin layer, and wherein the first layer further comprises a second meltblown polyolefin layer between the first sublayer and the second sublayer.

5. The fabric composite of claim 3, wherein at least one of the first spunbond polyolefin layer, the second spunbond polyolefin layer, or the meltblown polyolefin layer comprises at least one of polypropylene, polyethylene terephthalate, high-density polyethylene, low-density polyethylene, or linear low-density polyethylene.

6. The fabric composite of claim 3, wherein:

the first spunbond polyolefin layer comprises at least one of polypropylene, polyethylene terephthalate, high-density polyethylene, low-density polyethylene, or linear low-density polyethylene, the meltblown polyolefin layer comprises at least one of polyethylene terephthalate, high-density polyethylene, low-density polyethylene, or linear low-density polyethylene; and the second spunbond polyolefin layer comprises at least one of polyethylene terephthalate, high-density polyethylene, low-density polyethylene, or linear low-density polyethylene.

7. The fabric composite of claim 3, wherein:

the first sublayer has a basis weight from 15 to 20 grams per square meter (gsm), the second sublayer has a basis weight from 7 to 9 gsm, and the third sublayer has a basis weight from 15 to 20 gsm.

8. The fabric composite of claim 1, wherein the second layer has a basis weight from 20 to 70 gsm.

9. The fabric composite of claim 1, wherein the hot-melt adhesive layer comprises a thermoplastic.

10. The fabric composite of claim 9, wherein the thermoplastic comprises one of polypropylene, amorphous poly-alpha-olefin (APAO), a butene-1 copolymer, modified t-APAO, ethyl vinyl acetate, or polyurethane.

11. The fabric composite of claim 1, wherein the first layer exhibits water uptake in the amount of less than 50% water absorption after 5-second submersion.

12. The fabric composite of claim 1, wherein one or more of:

the first layer exhibits a bond with the second layer having a bond strength according to a T-peel method (ASTM 1876-08) of at least 0.5 lbf; or the fabric composite exhibits a hydrostatic head resistance (AATCC 1270-1985 Option 2) of from 4 to 40 inches of water.

13. A gypsum underlayment sound control mat comprising:

the fabric composite of claim 1; and an entangled mesh layer.

14. The mat of claim 13, wherein one or more of:

the fabric composite is bonded to the entangled mesh layer;

the entangled mesh layer comprises a nonwoven polyolefin layer; or the first layer is between the second layer and the entangled mesh layer.

15. A flooring system comprising:

the fabric composite of claim 1; and a gypsum or gypsum-concrete underlayment positioned adjacent the fabric composite.

16. The flooring system of claim 15, further comprising an entangled mesh layer.

17. The flooring system of claim 15, wherein the second layer is between the first layer and the underlayment.

18. A method for forming the fabric composite of claim 1, the method comprising at least the steps of:

applying the hot-melt adhesive to one surface of at least one of the first layer or the second layer; and positioning the first and second layers relative to one another with the applied hot-melt adhesive intermediate thereto, so as to bond the first and second layers to one another, respectively.

* * * * *